US012688423B2

(12) United States Patent
Cosentino et al.

(10) Patent No.: US 12,688,423 B2
(45) Date of Patent: Jul. 21, 2026

(54) MACHINE LEARNING MODEL COMPRESSION

(71) Applicant: Salesforce, Inc., San Francisco, CA (US)

(72) Inventors: Romain Cosentino, San Francisco, CA (US); Sarath Shekkizhar, San Francisco, CA (US); Damjan Kalajdzievski, San Francisco, CA (US); Adam Earle, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 1 day.

(21) Appl. No.: 18/905,761

(22) Filed: Oct. 3, 2024

(65) Prior Publication Data

US 2026/0099712 A1    Apr. 9, 2026

(51) Int. Cl.
*G06N 3/0495*      (2023.01)
*G06N 3/082*       (2023.01)

(52) U.S. Cl.
CPC ........... *G06N 3/082* (2013.01); *G06N 3/0495* (2023.01)

(58) Field of Classification Search
None
See application file for complete search history.

(56) References Cited

U.S. PATENT DOCUMENTS

| | | | |
|---|---|---|---|
| 11,922,324 | B1 | 3/2024 | Cosentino et al. |
| 12,086,572 | B1 * | 9/2024 | Wu ........................... G06N 3/04 |
| 12,277,396 | B2 | 4/2025 | Earle et al. |
| 12,314,663 | B1 | 5/2025 | Earle et al. |
| 2018/0260695 | A1 * | 9/2018 | Majumdar ............. G06N 3/084 |
| 2019/0370656 | A1 * | 12/2019 | Xie ........................ G06N 3/045 |
| 2020/0175362 | A1 * | 6/2020 | Zhang ..................... G06N 3/04 |
| 2022/0327386 | A1 * | 10/2022 | Ben-Dror .............. G06N 3/082 |
| 2022/0367052 | A1 * | 11/2022 | Liu ........................ G16H 50/20 |
| 2023/0015895 | A1 * | 1/2023 | Goyal ................... G06F 40/284 |
| 2024/0064318 | A1 * | 2/2024 | Letunovskiy .......... H04N 19/42 |
| 2024/0144012 | A1 * | 5/2024 | Choi ........................ G06N 3/04 |
| 2024/0202600 | A1 * | 6/2024 | Poirier ................... G06F 40/20 |
| 2024/0281472 | A1 * | 8/2024 | LaRhette .......... G06F 16/24575 |

OTHER PUBLICATIONS

Zhang et al., "Ada ViT: Task Adaptive ViT Compression Based on Module Replacement", (Aug. 2024) (Year: 2024).*
Liu et al., "Learned Image Compression with Mixed Transformer—CNN Architectures", (2023) (Year: 2023).*
Ganesh et al., "Compressing Large-Scale Transformer-Based Models: A case study on BERT", (2021) (Year: 2021).*

* cited by examiner

*Primary Examiner* — Usmaan Saeed
*Assistant Examiner* — Beatriz Ramirez Bravo
(74) *Attorney, Agent, or Firm* — Nicholson De Vos Webster & Elliott LLP

(57)                ABSTRACT

Techniques are described herein for a method of machine learning model compression. The method includes receiving a machine learning model comprising a plurality of blocks. The method further includes removing one or more blocks of the plurality of blocks to obtain an intermediate machine learning model comprising a subset of the plurality of blocks. The method further includes adding a block to the intermediate machine learning model to obtain a compressed machine learning model. The block generates an output corresponding to an output of the removed one or more blocks of the plurality of blocks. The method further includes executing the compressed machine learning model on a low resource device.

17 Claims, 9 Drawing Sheets

MACHINE LEARNING MODEL COMPRESSION

BACKGROUND

The field of Artificial Intelligence (AI) focuses on the implementation of artificial neural network systems that aim to mimic the functionality of neurons in the brain. Machine learning is a sub-area of AI in which a machine learning model is trained to perform one or more specific tasks. For instance, a machine learning model can be trained to perform a target task by relying on patterns and inferences learned from training data, without requiring explicit instructions pertaining to how the task is to be performed.

SUMMARY

Techniques are described herein for a method of machine learning model compression. The method includes receiving a machine learning model comprising a plurality of blocks. The method further includes removing one or more blocks of the plurality of blocks to obtain an intermediate machine learning model comprising a subset of the plurality of blocks. The method further includes adding a block to the intermediate machine learning model to obtain a compressed machine learning model. The block generates an output corresponding to an output of the removed one or more blocks of the plurality of blocks. The method further includes executing the compressed machine learning model on a low resource device.

BRIEF DESCRIPTION OF THE DRAWINGS

The detailed description is described with reference to the accompanying drawings in which.

DETAILED DESCRIPTION

Figure 1:
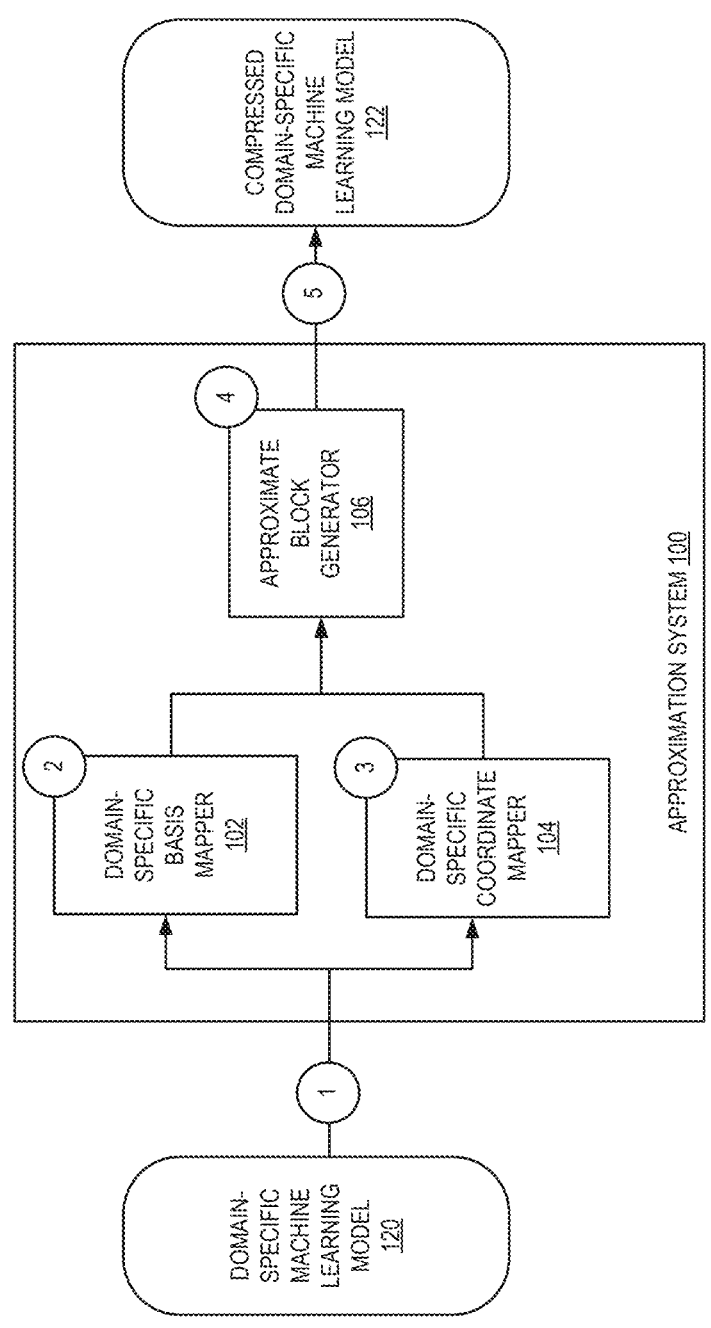
FIG. 1 illustrates an example approximation system in accordance with one or more embodiments.

One of more embodiments of the present disclosure include an approximation system used to remove a number of layers from a neural network and substitute a block for the removed layers. The block is created by the approximation system to generate an output that corresponds to an output of the removed layers from the neural network. As a result, the number of layers of the neural network are compressed, conserving computing resources. For example, as a result of using fewer layers to process an input, compressed models reduce computing resources associated with processing the input by reducing the number of mathematical operations performed. The compressed model also advantageously reduces latency associated with generating an output. For instance, the compressed model can determine an output in less time than a non-compressed model as a result of executing fewer mathematical operations and therefor using fewer computing resources to generate the output. Additionally, compressed models can conserve computing resources such as memory because such models have a smaller number of parameters (such as layers, weights, and neurons) stored in memory.

A large language model (LLM) is one example of a neural network model. LLMs use billions of parameters to extract meaningful features (e.g., underlying patterns, characteristics, processes, etc.) of human language and predict coherent and contextualized responses to an input. Specifically, LLMs are trained to predict a next token of a block of text. In operation, LLMs track relationships in sequential data by receiving tokens (e.g., words in a sentence) and predicting a next token (or sequence of tokens). Accordingly, LLMs are well suited to form conversations (e.g., taking turns asking questions and providing responses) by predicting tokens (or sequences of tokens) that are tailored to the style and context of the conversation. The input to an LLM is referred to as a prompt and includes a task description and natural language text such as a question or a statement. The size and complexity of LLMs can prevent LLMs from being deployed in various computing devices, limiting the use of LLMs. For instance, the computing resources (e.g., bandwidth, power, memory) associated with deploying the LLM to perform the task in the prompt can be too costly for some computing devices, preventing the LLM from being deployed in various situations.

A pretrained LLM is an LLM trained on data such as the Internet to tune billions of parameters of the LLM. As a result of such training, the LLM captures many different styles, tones, and patterns that are used to generate the coherent and contextualized responses of the LLM. Fine-tuning the LLM may refer to a mechanism of adjusting parameters of a previously trained LLM by training the pretrained LLM to perform new task and/or training the pretrained LLM using new data such as domain-specific data.

A domain-specific LLM is an LLM trained to perform domain-specific tasks using domain-specific data, in addition to the natural language tasks learned by the LLM during the initial LLM training (e.g., the pretraining, as described above). A domain can include a particular technology field, service field, product, and the like. Domain-specific data may include domain-specific vocabulary, domain-specific style (e.g., casual conversational styles, professional conversational styles), and/or domain-specific formatting. For example, a reward number associated with a first domain can be four digits such that the reward number "1234" is a valid reward number. In a second domain, a reward number is six digits such that the reward number "1234" is an invalid reward number.

The characteristics of domain-specific data distinguish such data from other domains that may not have the same vocabulary, style preferences, and/or formatting preferences. For example, the questions asked, the answers provided, the vocabulary, and the tone of a first domain (e.g., a medical domain) can be different from the questions asked, the answers provided, the vocabulary, and the tone of the second domain (e.g., a hospitality domain).

Compressing an LLM is one mechanism of enabling different computing devices to execute the LLM. As a result, the LLM can be deployed in various situations in furtherance of various application. One conventional approach of compressing a LLM (or more generally, a neural network) is to compress the number of bytes stored by a neuron. A neuron includes an activation function that maps a preactivation of a neuron to an output activation. The activation function allows a neuron to represent a nonlinear function, and the nonlinearities in the neural network enable the neural network to capture complex patterns of the input data. The neuron is a vector with a number of dimensions equal to the dimension of the preactivation, and each dimension of the neuron stores information using a floating point value.

Reducing the number of bits represented by the floating point value reduces computing resources associated with performing mathematical computations on large floating point values and also reduces memory resources associated with storing such large floating point values. For example, conventional approaches can encode a neuron that stores 32 bits of information to a neuron that stores 8 bits of information. Other conventional approaches can compress a neuron that stores 8 bits of information to a neuron that stores 1 bit of information. However, such general compression techniques compress the information stored by each neuron without control or an understanding of the data that is being lost in the compression. For example, such general compression techniques can alter a natural language understanding capability of a neural network such as the LLM. For instance, the LLM's ability to generate a coherent and contextualized response can decrease as information is truncated in neurons of the neural network.

Other conventional approaches compress a neural network by pruning neurons in the neural network. Pruning neurons of a neural network includes identifying one or more redundant neurons and deactivating or removing such neurons. After removing redundant neurons of the neural network, the neural network is retrained. However, obtaining training data can be costly. For example, training data labels are manually generated or generated using a machine learning model at the expense of computing resources associated with generating such data. Further, storing the training data can be costly in terms of memory, and training large language models can consume significant resources as the training period can last weeks or months.

In addition, when neurons are pruned, the value of the neuron is set to zero. In general, conventional systems leverage the computational gain associated with pruned neurons using sparse matrices. The efficient computation of sparse matrices conventionally includes using Compute Unified Device Architecture (CUDA) kernels, which can be very complex. Moreover, conventional systems shard machine learning models such as LLMs across graphics processing units (GPUs), increasing the complexity of the sparse matrix computations that require CUDA kernels. As a result, pruning neurons in the neural network can be significantly difficult to implement.

To address these and other deficiencies of conventional approaches, the approximation system of the present disclosure compresses a neural network by removing layers in the neural network in a domain-specific manner. Removing layers of a neural network reduces the number of computations associated with performing a task of the LLM, based on the reduced number of weights and neurons associated with the removed layer. Accordingly, computing resources (such as power, bandwidth, and memory) are conserved as mathematical operations associated with the removed layer are not performed. In addition, compression of a neural network by removing one or more layers reduces latency associated with the LLM performing a task.

FIG. 1 illustrates an example approximation system in accordance with one or more embodiments. In some embodiments, the approximation system 100 may be incorporated into an application, a suite of applications, etc. or may be implemented as a standalone system which interfaces with an application, a suite of applications, etc. The approximation system 100 is used to generate a block of a neural network that is used as a substitute for multiple blocks of the neural network. Because each block includes a number of layers, the approximation system 100 performs layer level compression. The substitution of one block for multiple blocks in the neural network constitutes the compression of the neural network. It should be appreciated that while one block is described herein, there may be multiple blocks generated by the approximation system 100 and used, as substitutes, for multiple blocks of the neural network.

At numeral 1, the domain-specific machine learning model 120 is passed to the approximation system 100. The domain-specific machine learning model 120 is any machine learning model that is trained to perform a domain-specific task. For example, the domain-specific machine learning model 120 can be a LLM trained to perform natural language understanding tasks such as conversing with a user about information relevant to a particular domain. In a non-limiting example, if the machine learning model is a LLM, the domain-specific machine learning model 120 is a LLM configured to generate questions and answers in furtherance of scheduling a doctor's appointment (e.g., asking the user for insurance information, informing the user of a doctor's area of expertise, scheduling an appointment for the user that does not conflict with other appointments, informing the user of the user's last appointment, etc.). The domain-specific machine learning model 120 can be fine-tuned or pretrained in accordance with a target domain such that the domain-specific machine learning model 120 has knowledge of that domain (e.g., there is a set of stored hyperparameters and weight values, for instance, associated with the target domain). In some embodiments, the target domain is a sub-set of multiple sets of domains of the domain-specific machine learning model 120. While the approximation system 100 is illustrated as receiving a domain-specific machine learning model 120, in some embodiments, the approximation system 100 trains a neural network model using domain-specific training data to obtain domain-specific machine learning model 120 (not shown).

At numeral 2, a domain-specific basis mapper 102 receives the domain-specific machine learning model 120. The domain-specific basis mapper 102 is used to predict a domain-specific basis associated with an input embedding (e.g., a local linear space referred to herein as a "region" around the input embedding). In operation, when the domain-specific machine learning model 120 receives a domain-specific input token, the domain-specific machine learning model 120 processes the input token by predicting a domain-specific next token. During processing of the input token, the domain-specific machine learning model 120 transforms the domain-specific input token into a different representation of the input token (e.g., a lower-dimensional or higher-dimensional representation of the input token) in an embedding space. The embedding space (also referred to as a manifold) is a space used to encode the domain-specific input token. The domain-specific region predicted by the domain-specific basis mapper 102 is a particular domain-specific region in the embedding space.

At numeral 3, the domain-specific coordinate mapper 104 receives the domain-specific machine learning model 120. The domain-specific coordinate mapper 104 is used to predict a coordinate location of an embedding in the embedding space. Coordinate locations in an embedding space are used to capture or otherwise track sequential information. As described herein, machine learning models such as LLMs are able to generate natural language text in a coherent manner. The generation of such natural language text is due, in part, to the sequence of coordinates of the predicted next token in an embedding space. The domain-specific coordinate mapper 104 is used to predict coordinates associated with the next domain-specific token in embedding space.

At numeral 4, the approximate block generator 106 uses the domain-specific basis mapper 102 and the domain-specific coordinate mapper 104 to generate a block. The generated block replaces a number of blocks of the domain-specific machine learning model 120. In some embodiments, the approximate block generator 106 removes sequential blocks from the domain-specific machine learning model 120. As a result, an intermediate domain-specific machine learning model includes a subset of blocks, where the subset of blocks includes the number of blocks of the domain-specific machine learning model 120 minus the removed blocks. The first block in the sequence of blocks before the removed blocks is called a first adjacent block, and the first block in the sequence of blocks after the removed block is the second adjacent block. Subsequently, the approximate block generator 106 adds a block to the intermediate machine learning model between the first and second adjacent blocks such that the added block replaces the removed blocks in the sequence of blocks.

The substitution of the one block for the multiple removed blocks reduces the size and complexity of the domain-specific machine learning model 120 (in terms of the number of layers of the domain-specific machine learning model 120, the number of computations associated with performing a task of the domain-specific machine learning model 120, and the like). Accordingly, at numeral 5, the output of the approximation system 100 is a compressed domain-specific machine learning model 122. The compressed domain-specific machine learning model 122 is compressed in such a way that the target domain of the domain-specific machine learning model 120 is learned (e.g., via approximating blocks of the domain-specific machine learning model 120 as described herein).

Figure 2:
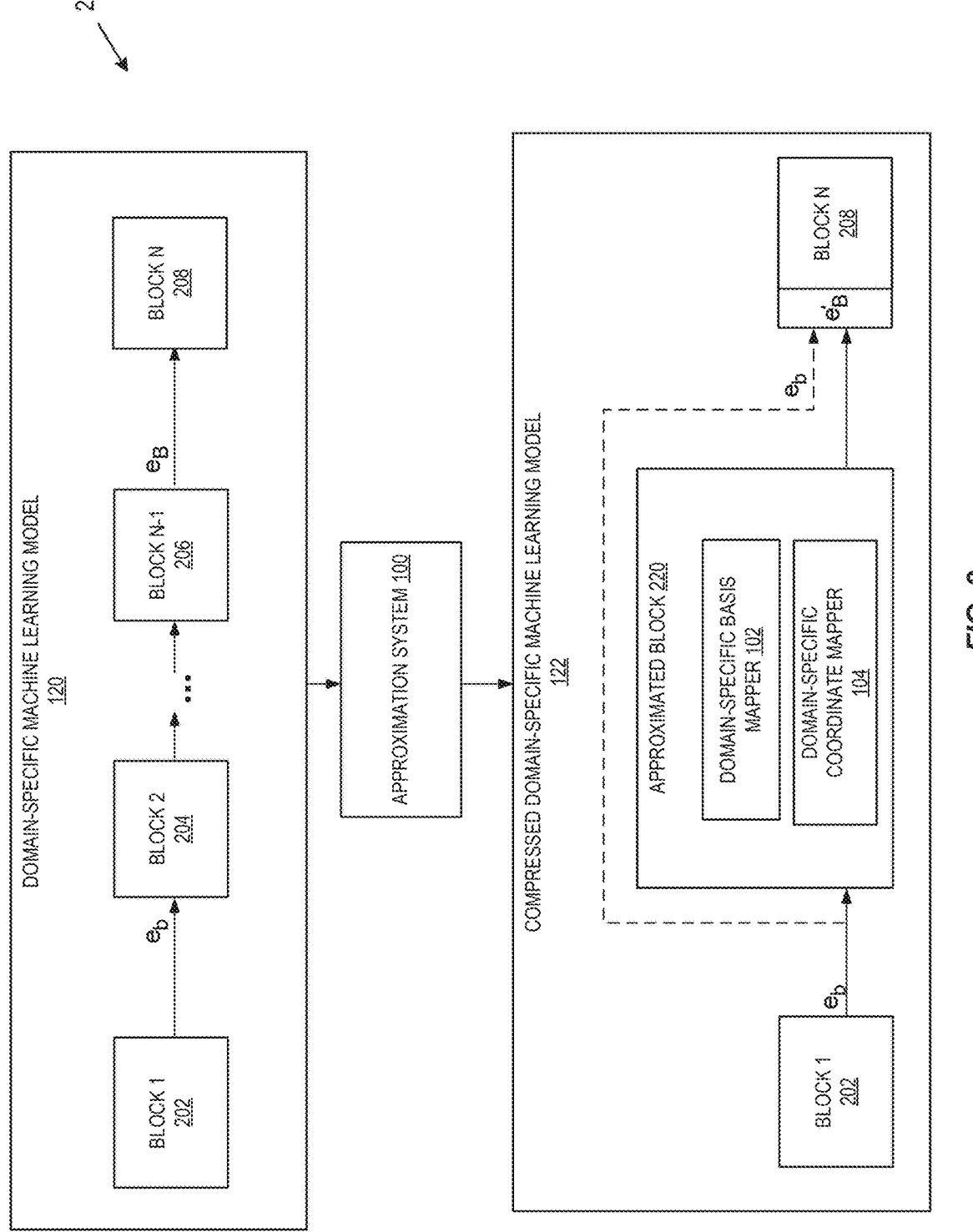
FIG. 2 illustrates an example of the domain-specific machine learning model and an example of the compressed domain-specific machine learning model, in accordance with one or more embodiments.

FIG. 2 illustrates an example of the domain-specific machine learning model and an example of the compressed domain-specific machine learning model, in accordance with one or more embodiments. As shown in example 200, the domain-specific machine learning model 120 includes N number of sequential blocks. A block of a machine learning model (such as a block of the domain-specific machine learning model 120 and/or a block of the compressed domain-specific machine learning model 122) includes a stack of sequential layers configured to perform a task. For example, a block of a machine learning model can be a stack of layers such as an encoder, a decoder, a transformer, feed forward layers, self-attention layers, cross-attention layers, and the like.

The output of each block of a machine learning model (such as domain-specific machine learning model 120 and the compressed domain-specific machine learning model 122) is an embedding. An embedding is a latent space representation of an input (e.g., an input token) that encodes the meaning of the input in an embedding space. The embedding is a vector representation of the input token.

As shown, the domain-specific machine learning model 120 includes a number of N blocks including block 1 202 to block N 208. Each sequential block of the domain-specific machine learning model 120 transforms an input (e.g., natural language text) into a representation of the input (e.g., a high dimensional representation, a low dimensional representation, an encoded token, extracted features or properties associated with the token, a masked representation of the token, and/or some combination). The machine learning model (such as domain-specific machine learning model 120 and/or compressed domain-specific machine learning model 122) can generate an output (e.g., a predicted next token) using the sequential processing of representations (e.g., embeddings) corresponding to the input.

The input to the last block of a machine learning model (e.g., block N 208) is an embedding that is used to determine a predicted next token associated with a domain-specific response. The output of the last block, block N 208, is a k-dimensional vector of logits, where the number k of unnormalized scores corresponds to k candidate domain-specific predicted next tokens for the predicted next token. Each dimension of the k-dimensional vector represents a domain-specific token of k candidate domain-specific predicted next tokens for the next token. The output of the last block can also include a probability distribution. In some embodiments, block N 208 can include a softmax function, which is a normalized exponential function that transforms an input of real number logits (e.g., embedding $e_B$) into a normalized probability distribution over candidate domain-specific predicted next tokens. The probability distribution represents the probability of each of the k candidate domain-specific predicted next tokens being the next token. An accumulation of predicted next tokens can become a natural language response to a user query. In example 200, the input to block N 208 is shown as embedding $e_B$.

As shown in example 200, the approximation system 100 removes block 2 204 to block to block N−1 206 and substitutes a number of N−3 removed blocks from the domain-specific machine learning model 120 for approximated block 220 in the compressed domain-specific machine learning model 122. That is, the approximation system 100 removes a number of N−3 blocks and adds the approximated block 220 such that the approximated block 220 is one block that corresponds to many blocks of the domain-specific machine learning model 120. In some embodiments, the number of blocks that are removed (and approximated by the approximated block 220) is based on an experimentally determined heuristic. In other embodiments, the number of blocks that are removed is user selected.

In operation, an embedding representation of an input token (determined by block 1 202, for instance) $e_b$ is provided to the approximated block 220. In some embodiments, the embedding $e_b$ is provided to both the domain-specific basis mapper 102 and domain-specific coordinate mapper 104 in parallel. The domain-specific basis mapper 102 of the approximated block 220 maps an input representation (e.g., e) which is represented using a vector) to a domain-specific region, i.e., a basis, in which the local linear space around the embedding $e_B$ is located. In other words, the domain-specific basis mapper 102 determines a predicted location of embedding $e_B$ in domain-specific embedding space (e.g., a basis of a manifold). In some embodiments, the predicted location of the embedding $e_B$ in domain-specific embedding space is represented as a matrix. The domain-specific coordinate mapper 104 of the approximated block 220 maps the input representation to a coordinate location, which represents sequencing information of the embedding $e_B$. In some embodiments, the predicted coordinates of the embedding $e_B$ is represented as a vector. The combination of the coordinate location and the domain-specific embedding space is used to determine $$e'_B.$$

As shown in example 200, the domain-specific machine learning model 120 determines embedding $e_B$, an embedding of the predicted next token associated with a domain-specific response, by sequentially processing embedding $e_B$ through block 2 204 to block N−1 206. That is, embedding $e_B$ is dependent on the output of each of the previous blocks of the domain-specific machine learning model 120. In operation, block N 208 uses embedding ep to determine a domain-specific next token.

In contrast, block N 208 of the compressed domain-specific machine learning model 122 uses embedding $$e'_B$$

to determine the domain-specific next token, where embedding $$e'_B$$

corresponds to a prediction of embedding $e_B$. As described herein, embedding $$e'_B$$

is not generated by the sequential processing of embedding $e_b$. Instead, $$e'_B$$

is determined by predicating a domain-specific region space and a coordinate location using the domain-specific basis mapper 102 and the domain-specific coordinate mapper 104 respectively. Note that the input to the domain-specific basis mapper and the domain-specific coordinate mapper is $e_b$, that is, the output of the maintained blocks before the compressed domain-specific machine learning model 122.

Accordingly, embedding $$e'_B$$

8 determined by the approximated block 220 is an approximate or predicted value of embedding $e_B$ determined by the sequence of blocks of the domain-specific machine learning model 120. In other words, the embedding $$e'_B$$

determined by the domain-specific basis mapper 102 and the domain-specific coordinate mapper 104 corresponds to the output of the removed blocks of the domain-specific machine learning model 120 (e.g., embedding $e_B$). Because embedding $$e'_B$$

determined by the approximated block 220 of the compressed domain-specific machine learning model 122 is approximately equal to the value of embedding $e_B$ determined by the sequence of blocks of the domain-specific machine learning model 120, the domain-specific next token determined by the domain-specific machine learning model 120 is the same or approximately the same as the domain-specific next token determined by the compressed domain-specific machine learning model 122. Accordingly, the accuracy of the compressed domain-specific machine learning model 122 is at least as good as the accuracy of the domain-specific machine learning model 120 in performing a domain-specific task (e.g., a natural language task such as next token prediction).

While embedding $$e'_B$$

is illustrated as using input w block N 208, it should be appreciated that embedding $$e'_B$$

represents the output embedding determined by the approximated block 220, which is an approximated representation of $e_B$ determined by the sequence of blocks replaced with the approximated block 220. That is, embedding $$e'_B$$

can be any downstream embedding, i.e., at any downstream block, corresponding to embedding $e_B$ with respect to embedding $e_b$.

As shown, in some embodiments, embedding $$e'_B$$

is generated using a residual connection from block 1 202. Accordingly, in some embodiments, embedding $$e'_B$$

is based on embedding $e_b$. Adding such a residual connection is optional and may improve the stability of the compressed domain-specific machine learning model 122 during training (e.g., training the domain-specific basis mapper 102 and the domain-specific coordinate mapper 104 described herein). In other embodiments, embedding $$e'_B$$

is not generated using a residual connection from block 1 202.

It should be appreciated that while one approximated block 220 is shown in the compressed domain-specific machine learning model 122, multiple approximated blocks can be generated by the approximation system 100 as substitutions for blocks of the domain-specific machine learning model 120. Further, while approximated block 220 is shown adjacent to block N 208 and block 1 202, the approximated block 220 can be adjacent to any block of the compressed domain-specific machine learning model 122. For example, the approximated block 220 can approximate the sequence of blocks from block 3 (not shown) to block N−2 (not shown) such that the approximated block 220 generates an embedding representation (e.g.

$$e'_B)$$

that is passed to block N−1 206. That is, the compressed domain-specific machine learning model 122 can pass embedding representations through any number of blocks before the approximated block 220 and/or after the approximated block 220.

Figure 3:
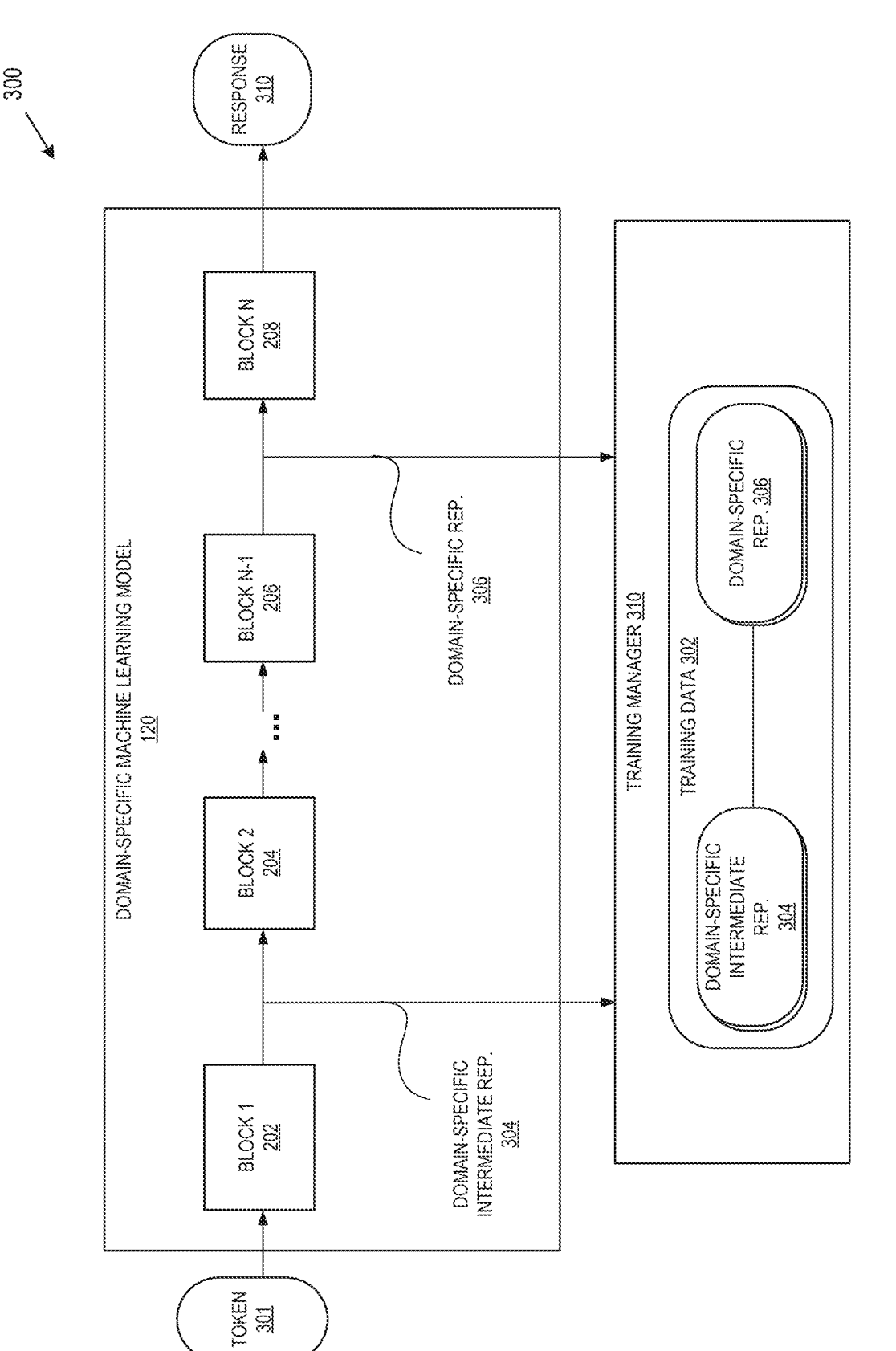
FIG. 3 is a flow diagram of an example method for collecting training data used to train the domain-specific basis mapper and the domain-specific coordinate mapper of the approximation system, in accordance with some embodiments.

FIG. 3 is a flow diagram of an example method for collecting training data used to train the domain-specific basis mapper and the domain-specific coordinate mapper of the approximation system, in accordance with some embodiments. Any domain-specific data can be used by the training manager 310 to collect training data 302. For example, token 301 can be a tokenized representation of conversation data including audio data (e.g., a user speaking to a domain-specific customer service agent over a telephone), text data (e.g., a user chatting using natural language text with a domain-specific customer service agent), and/or video data (e.g., a user visually communicating with a domain-specific customer service agent using a camera or other sensor(s)). The domain-specific customer service agent is represented in FIG. 3 as the domain-specific machine learning model 120 (e.g., a domain-specific LLM). The training manager 310 collects training data associated with the target domain of the domain-specific machine learning model 120 such that the domain-specific basis mapper and the domain-specific coordinate mapper are trained on training data associated with the target domain.

In some embodiments, the token 301 can be a tokenized representation of text data such as a word-by-word stream of words transcribed in real time spoken by the user, where the text data is generated at a time when a user is actively engaged in a communication with the domain-specific customer service agent. Additionally or alternatively, the token

301 can be a tokenized representation of text data such as log data accumulated over a portion of a conversation between the user and the domain-specific customer service agent. A portion of the conversation can include a number of past turns of the conversation, a number of the most recent text (e.g., words, sentences, phrases, characters, etc.), a number of the most recent seconds of the conversation, a number of bytes of buffered text, and the like.

A turn is an interaction of the conversation, such as block of speech (audio or text) communicated by one of the participants in the conversation (e.g., a user and/or the domain-specific customer service agent). For instance, one turn of the conversation can include a user speaking to an automated chat bot (e.g., domain-specific machine learning model 120). A subsequent turn of the conversation includes the chat bot's response to the user. Accordingly, the token 301 can include tokens of the k most recent turns of the conversation. Additionally or alternatively, token 301 includes all of the turns of the conversation (e.g., all of the tokens). For example, the token 301 can include text associated with every turn from the initialization of the conversation to the current position in the conversation.

As described herein, each block of the domain-specific machine learning model 120 generates an embedding representation of the token 301. The sequential processing of such embedding representations is used to predict a domain-specific next token, representing the likely next word, character, and/or phrase associated with the token 301 input. One or more predicted next tokens determined by the domain-specific machine learning model 120 become response 314. That is, the domain-specific machine learning model 120 iteratively predicts next tokens until response 314 is generated, where response 314 can be a phrase of a domain-specific conversation between a user and a chat bot (e.g., domain-specific machine learning model 120).

The training manager 310 collects training data 302 associated with the domain specific data (e.g., the token 301 and the response 314). The training data 302 includes input-output pairs used during supervised training to train the domain-specific basis mapper 102 and the domain-specific coordinate mapper 104 described herein.

The input-output pairs of the training data 302 are based on the inputs and outputs of the approximated block. In a non-limiting example, if the approximated block is to replace block 2 204 and block N−1 206, then the input to the approximated block is the input to block 2 204 and the output of the approximated block is the output of block N−1 206. Accordingly, the training manager 310 collects training data 302 at the input to block 2 204 and the output of block N−1 206. As shown in example 300, the training input of the training data 302 is the domain-specific intermediate representation 304 (e.g., embedding $e_b$), sampled at the input to block 2 204. Similarly, the training output of the training data 302 is the domain-specific representation 306 (e.g., embedding $e_B$) corresponding to the domain-specific intermediate representation 304. Because the approximated block approximates an embedding representation of a downstream block (e.g., block N−1 206) in furtherance of generating an embedding representation that represents a predicted domain-specific next token, the domain-specific representation 306 (e.g., embedding $e_B$) represents the domain-specific representation of the predicted domain-specific next token.

In some embodiments, each pair of training data 302 (e.g., domain-specific intermediate representation 304 and domain-specific representation 306) is encoded with positional information to indicate a position of the token 301 with respect to the input. For example, if the input is a sentence and each token 301 represents a word of the sentence, then the position information associated with each pair of training data 302 can indicate the domain-specific intermediate representation and corresponding domain-specific representation 306 associated with the first token (e.g., the first word of the sentence), the domain-specific intermediate representation and corresponding domain-specific representation 306 associated with the second token (e.g., the second word of the sentence), and so on.

Figure 4:
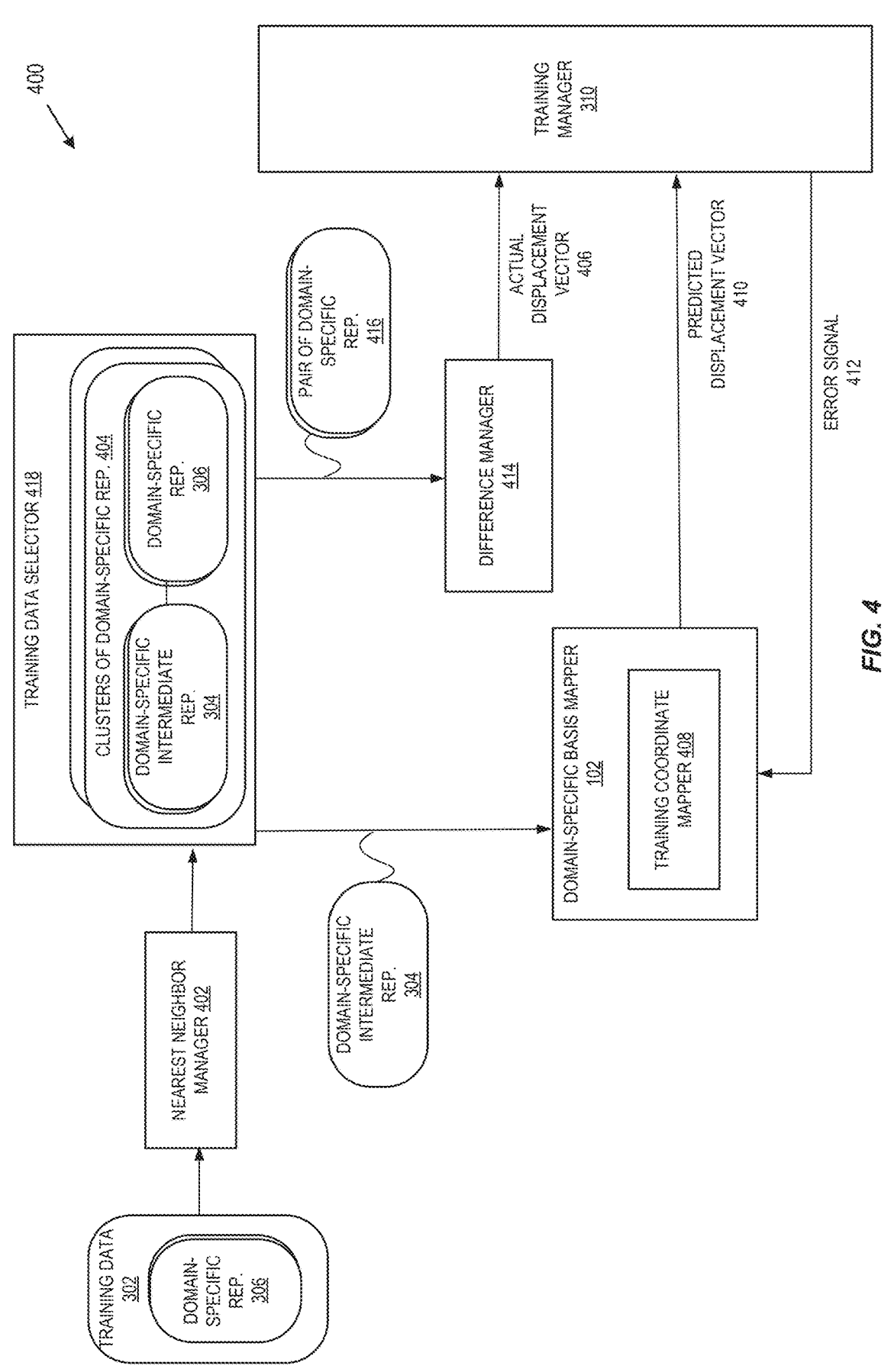
FIG. 4 is a flow diagram of an example method for training the domain-specific basis mapper, in accordance with some embodiments.

FIG. 4 is a flow diagram of an example method for training the domain-specific basis mapper, in accordance with some embodiments. The training manager 310 trains the domain-specific basis mapper 102 to capture a domain-specific region in embedding space using a displacement between neighbor embeddings in the domain-specific region. In operation, the training manager 310 trains the domain-specific basis mapper 102 to map an embedding to a corresponding domain-specific region in an embedding space. For example, the training manager 310 uses nearest neighbors and a reconstruction loss, as described herein, to train the domain-specific basis mapper 102.

The domain-specific basis mapper 102 is trained using training data 302 including input-output pairs. As shown in example 400, training data 302 includes a domain-specific representations 306, where the domain-specific representation 306 is a representation (such as an embedding) of the output of the approximated block (e.g., embedding $e_B$). As described herein, each domain-specific representation 306 is a downstream embedding of a domain-specific intermediate representation 304 (e.g., embedding $e_b$). In some embodiments, a set of domain-specific representations 306 is passed to the nearest neighbor manager 402. The set of domain-specific representations 306 can include all of the domain-specific representations 306 stored as training data 302 and/or a portion of the domain-specific representations 306 stored as training data 302.

The nearest neighbor manager 402 makes clusters of domain-specific representations 404 using the set of domain-specific representations 306. In operation, the nearest neighbor manager 402 generates clusters where the number of samples per cluster depends on the nearest neighbors hyperparameters. In some embodiments, the nearest neighbor manager 402 clusters domain-specific representations 306 based on relative distances between the domain-specific representations 306.

In some embodiments, the nearest neighbor manager 402 can treat each domain-specific representation 306 as a centroid. The nearest neighbor manager 402 clusters the domain-specific representations 306 based on the relative distances of the domain-specific representation samples 306 to the other domain-specific representations 306. Distance measures may include, for example, the smallest distance to other domain-specific representations 306, the smallest average distance to other domain-specific representations 306, the smallest sum of squares of distances to other domain-specific representations 306, and the like.

Each cluster of the clusters of domain-specific representations 404 represents a collection of embeddings (e.g., domain-specific representations 306) that share similarities. For example, because each embedding represents a predicted next token responsive to an input (e.g., an input token such as a sentence), the clusters of domain-specific representations 404 correspond to clusters of domain-specific natural language. For example, a first cluster of domain-specific representations 404 can correspond to natural language associated with making a hotel reservation. For instance, a first domain-specific representation of the first cluster of domain-specific representations 404 can correspond to "I want to make a reservation at Hotel X" and a second domain-specific representation of the first cluster of domain-specific representations 404 can correspond to "I want to reserve a suite with a view at Hotel X." In the above example, the first domain-specific representation of the first cluster of domain-specific representations 404 can correspond to embedding 1 for instance (e.g., $e_{B1}$) and second the domain-specific representation of the first cluster of domain-specific representations 404 can correspond to embedding 10 for instance (e.g., $e_{B10}$).

In the above example, a second cluster of domain-specific representations 404 can correspond to natural language associated with making a dinner reservation at the hotel restaurant. For instance, a first domain-specific representation of the second cluster of domain-specific representations 404 can correspond to "I want to eat dinner at the hotel restaurant" and a second domain-specific representation of the second cluster of domain-specific representations 404 can correspond to "I want to make a reservation at Restaurant A in Hotel X." In the above example, the first domain-specific representation of the second cluster of domain-specific representations 404 can correspond to embedding 5 for instance (e.g., $e_{B5}$) and second the domain-specific representation of the second cluster of domain-specific representations 404 can correspond to embedding 15 for instance (e.g., $e_{B15}$).

The training data selector 418 stores clusters of domain-specific representations 404. Accordingly, the training data selector 418 stores domain-specific representations 306 in each cluster of domain-specific representation 404 and the corresponding domain-specific intermediate representation 304. For example, given the first cluster of domain-specific representations including embedding eps and embedding $e_{B15}$, the training data selector 418 stores domain-specific intermediate representation 304 (e.g., embedding $e_{b5}$ and embedding $e_{b15}$) associated with domain-specific representation 306 respectively (e.g., embedding $e_{B5}$ and embedding $e_{B15}$).

Two domain-specific representations 306 in a cluster of domain-specific representations 404 is a pair of domain-specific representations 416. Pairs of domain-specific representations 416 in each of the clusters of domain-specific representations 404 are passed to the difference manager 414. The difference manager 414 determines a distance between the pairs of domain-specific representations 416. For example, given the first cluster of domain-specific representations including embedding $e_{B5}$ and embedding $e_{B15}$ (e.g., a pair of domain-specific representations 416) the difference manager 414 would determine the distance between embedding $e_{B5}$ and embedding $e_{B15}$. For example, the difference manager 414 can determine the Euclidean distance between pairs of domain-specific representations 416 by taking the difference between embeddings (e.g., $e_{B5}-e_{B15}$). The norm of the difference is the distance (e.g., actual displacement vector distance 406) between pairs of domain-specific representations 416 in a cluster of domain-specific representations 404. The direction of the vector resulting in such a difference between pairs of domain-specific representations 416 represents an approximation of the locally linear space that includes the domain-specific representations 306. Accordingly, the domain-specific basis mapper 102 can learn the domain-specific region (e.g., the basis) that includes the local linear spaces associated with the domain-specific representations 306 in the pair of domain-specific representations 416. It should be appreciated that the difference manager 414 can evaluate the similarity of two embeddings using any similarity metric.

As described herein, each domain-specific representation 306 in the pair of domain-specific representations 416 is associated with a domain-specific intermediate representation 304. A domain-specific intermediate representation 304 associated with a domain-specific representation 306 in the pair of domain-specific representations 416 is passed to the domain-specific basis mapper 102.

As described herein, the domain-specific basis mapper 102 is trained to map an embedding (e.g., domain-specific intermediate representation 304 such as $e_{b5}$) to a domain-specific region (e.g., a basis referred to herein as a local linear region of a domain-specific embedding space), that is a matrix that captures the basis vector capturing the span of the locally linear space. The training coordinate mapper 408 is a learnable vector w that defines the coordinate of the difference vector (between the pair of domain-specific representations 416). For example, vector $w_{e_{B5}, e_{B15}}$ represents the coordinate of the difference vector between embedding $e_{B5}$ and embedding $e_{B15}$ in the basis (e.g., local linear space) defined by the domain-specific basis mapper. The combination of the domain-specific region with the vector w produces a vector having its direction and magnitude equal to the difference vector $e_{B5}$–$e_{B15}$ (e.g., predicted displacement vector 410). Accordingly, the combination of the domain-specific region determined by the domain-specific basis mapper 102 and the vector w determined by the training coordinate mapper 408 generates predicted displacement vector 410 (which is a variational vector). Mathematically, this is represented according to Equation (1) below:

$$e_{Bi} - e_{Bj} \approx J(e_{bi})w_{ij} \qquad (1)$$

In Equation (1) above, the domain-specific region including the pair of domain-specific representations 416 is represented as $J(e_{bi})$. In other words, the domain-specific region $J(e_{bi})$ includes the basis (e.g., the region of space) around the linear displacement of the pair of domain-specific representations, $e_{B5}$–$e_{B15}$. The location of the displaced embeddings in the domain-specific region is represented as $w_{ij}$. $J(e_{bi})$ represents the mapping performed by the domain-specific basis mapper 102 that is applied to domain-specific intermediate representation 304 of embedding $e_{bi}$ corresponding to domain-specific representation $e_{Bi}$, and $w_{ij}$ represents a learnable vector determined by the training coordinate mapper 408 between the pair of domain specific representations 416 (e.g., $e_{Bi}$ and $e_{Bj}$). Using unsupervised training for instance, the parameters of J and w can be iteratively adjusted such that the predicted displacement vector 410 converges with the actual displacement vector 406. As a result, the domain-specific basis mapper 102 learns to map the domain-specific intermediate representation 304 (e.g., $J(e_{bi})$) which output is a matrix consisting of the basis (e.g., a domain-specific region) around $e_{Bi}$.

In some embodiments, the domain-specific basis mapper 102 (represented as J in Equation (1)) is a neural network such as a convolutional network, a multi-layer perceptron, a transformer, and the like. In such embodiments, the domain-specific basis mapper 102 includes multiple layers, where each layer includes a number of nodes (e.g., neurons). The nodes perform a particular computation and are interconnected to nodes of adjacent layers using weights. Nodes in each of the layers sum up values from adjacent nodes and apply an activation function, allowing the layers to detect nonlinear patterns. The value of the weight interconnecting the nodes of adjacent layers adjusts the strength of the interconnected nodes in determining the output of the domain-specific basis mapper 102. The value of the weights is adjusted during a training period to increase the accuracy of the domain-specific basis mapper 102 in performing a task (e.g., mapping the domain-specific intermediate representation 304 to a domain-specific region to predict the domain-specific region of the domain-specific representation 306).

In some embodiments, the domain-specific basis mapper 102 is a combination of one or more functions that are used to map a vector input to a matrix. Accordingly, one or more hyperparameters of one or more functions are iteratively updated during the training period. Similarly, the training coordinate mapper 408 can be a neural network or a combination of one or more functions used to predict the coordinates, in the induced region mapper basis, of the displacement between pairs of domain-specific representations 416.

In operation, the training manager 310 compares the predicted displacement vector 410 determined by the domain-specific basis mapper 102 and the training coordinate mapper 408 and the actual displacement vector 406 determined by the difference manager 414 to determine an amount of error or difference between the predicted displacement vector 410 and the actual displacement vector 406. The error is computed using a loss function. Non-limiting examples of loss functions may include loss functions used to learn the local structure of the domain-specific region (e.g., as opposed to loss functions that are used to learn a task such as next token prediction used in natural language understanding models). An example loss function used to train the domain-specific basis mapper 102 is described in Equation (2) below:

$$\min_{J_{b \to B}, w_{ij}} \sum_{i=1}^{N} \sum_{j \in N(i)} \| e_B(i) + J_{b \to B}(e_b(i))w_{ij} - e_B(j) \| \qquad (2)$$

In Equation (2) above, $e(i) \forall i \in \{1, \ldots, N\}$ corresponds to the $i^{th}$ sample, and N(i) corresponds to the set of neighbors (e.g., a cluster of domain-specific representation 404) of the $i^{th}$ sample at block B (e.g., the last block approximated by the approximated block or the output of the approximated block).

In some embodiments, if the dimension of an embedding is d, then $J_{b \to B}(e_b(i)) \in \mathbb{R}^{d \times d_{in}}$. In other words, the mapper $J_{b \to B}(e_b(i))$ can be a block diagonal matrix by restricting the correlation between the dimension of the embedding and the dimension of the domain-specific region. Constraining the mapper $J_{b \to B}$ to the block diagonal matrix beneficially adds sparsity to the mapping of the domain-specific intermediate representation 304. In other words, the mapper $J_{b \to B}$ is a sparse matrix. A sparse matrix $J_{b \to B}$ beneficially conserves computing resources. For example, a sparse matrix can reduce computing resources associated with processing an input because the number of mathematical operations performed are reduced. That is, both computing resources and time are not spent processing multiplying values by zero. Accordingly, latency associated with generating an output of the compressed domain-specific machine learning model is reduced. Additionally, zero entries in a matrix can conserve computing resources such as memory associated with storing the matrix because only non-zero entries are fetched from memory. Accordingly, increasing the number of zero entries of a matrix corresponds to fewer non-zero entries being stored and/or fetched from memory of a computing device implementing the compressed domain-specific machine learning model 122.

The error, represented by error signal 412, is used to adjust both the domain-specific basis mapper 102 and the training coordinate mapper 408. For example, the domain-specific basis mapper 102 and the training coordinate mapper 408 can be updated using a backpropagation algorithm. The backpropagation algorithm operates by propagating the error signal 412 through weights of the domain-specific basis mapper 102 and/or the training coordinate mapper 408, for instance, such that the weights adapt based on the amount of error. Over a number of training iterations, the error of the error signal 412 decreases, representing a convergence of the predicted displacement vector 410 and the actual displacement vector 406.

The error may be calculated at each iteration (e.g., each pair of domain-specific representations 416 and corresponding domain-specific intermediate representation 304), batch, and/or epoch (e.g., a number of domain-specific representations 416 and corresponding domain-specific intermediate representation 304 included in a portion of training data 302). The training manager 310 trains the domain-specific basis mapper 102 and/or the training coordinate mapper 408 over time to generate an acceptably accurate (e.g., an accuracy satisfies a defined tolerance or confidence level) predicted displacement vector 410 in an embedding space. The domain-specific basis mapper 102 and/or the training coordinate mapper 408 may be trained until the error determined at the training manager 310 is within a certain threshold (or a threshold number of batches, epochs, or iterations have been reached).

In operation, the domain-specific basis mapper 102 nonlinearly maps a domain-specific intermediate representation 304 into a domain-specific region including the pair of domain-specific representations 416 using the mapper defined by $J(e_{bi})$. Each cluster of domain-specific representations 404 is associated with a unique domain-specific region learned by the domain-specific basis mapper 102.

Note that while $w_{ij}$ (e.g., the training coordinate mapper 408) is used to determine the displacement between a pair of domain-specific representations 416 in a domain-specific embedding space, in some embodiments, $w_{ij}$ is discarded after training. That is, the displacement between the pair of domain-specific representations 416 is used to train the domain-specific basis mapper 102 to learn the domain-specific embedding space, but the displacement between the pair of domain-specific representations 416 that is needed for inference or deployment of the compressed domain-specific machine learning model 122 will be trained using another paradigm described below (e.g., FIG. 5).

It should be appreciated that while example 400 describes vectors and matrices, other mathematical representations can be considered. Additionally, while unsupervised learning is described, other training methods can be used to train the domain-specific basis mapper 102.

Figure 5:
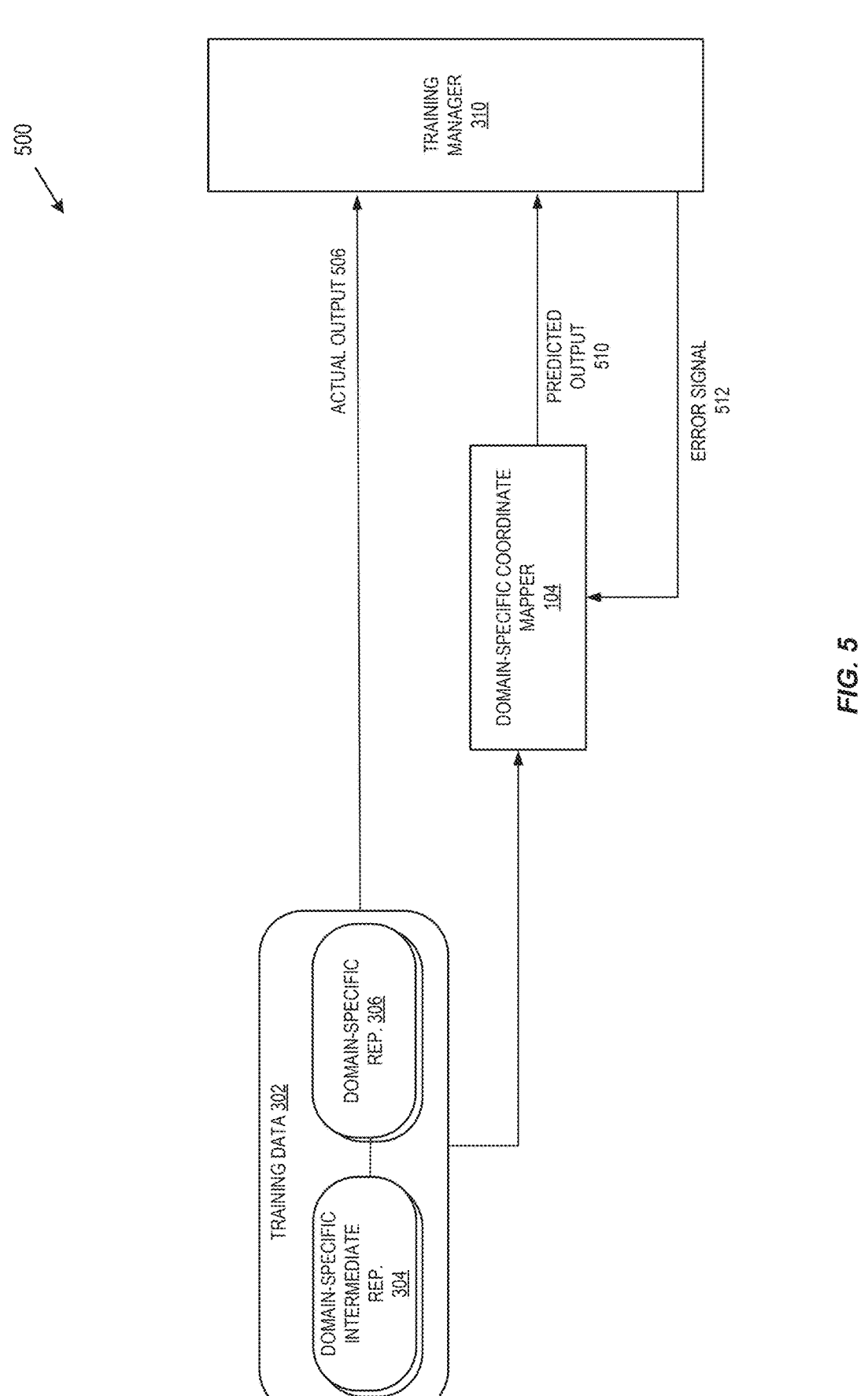
FIG. 5 is a flow diagram of an example method for training the domain-specific coordinate mapper, in accordance with some embodiments.

FIG. 5 is a flow diagram of an example method for training the domain-specific coordinate mapper, in accordance with some embodiments. The training manager 310 trains the domain-specific coordinate mapper 104 to capture a coordinate in a domain-specific region (e.g., where the domain-specific region is determined by the domain-specific basis mapper 102). In operation, the training manager 310 uses unsupervised learning to train the domain-specific coordinate mapper 104 to predict a coordinate associated with the domain-specific representation 306 in the domain-specific region.

As shown in example 500, training data 302 includes input-output pairs such as domain-specific intermediate representations 304 (e.g., embedding $e_b$) and corresponding domain-specific representations 306 (e.g., embedding $e_B$). As described herein, the domain-specific intermediate representation 304 is an example input of the approximated block. For example, the domain-specific intermediate representation 304 is an embedding representation of a token input into a machine learning model, such as a representation of the token 301 input into the domain-specific machine learning model 120 described in FIG. 3. The domain-specific representation 306 is an output of the approximated block. In operation, the output of the approximated block represents an embedding representation of a sequential downstream block in a machine learning model. Accordingly, the embedding representation of the sequential downstream block represents a domain-specific predicted next token. That is, given an input token t transformed into a domain-specific intermediate representation 304 (e.g., an embedding of token t at block b), the domain-specific representation 306 corresponds the t+1 token (e.g., an embedding of token t+1 at block B).

The domain-specific coordinate mapper 104 is any machine learning model or other process configured to capture sequences of sequential data. For example, the domain-specific coordinate mapper 104 can include a recurrent neural network or transformer that uses hidden states to track sequences in data. As described herein, a neural network includes multiple layers, where each layer includes a number of nodes (e.g., neurons). The nodes perform a particular computation and are interconnected to nodes of adjacent layers using weights. Nodes in each of the layers sum up values from adjacent nodes and apply an activation function, allowing the layers to detect nonlinear patterns. The value of the weight interconnecting the nodes of adjacent layers adjusts the strength of the interconnected nodes in determining the output of the domain-specific coordinate mapper 104. The value of the weights is adjusted during a training period to increase the accuracy of the domain-specific coordinate mapper 104 in performing a task (e.g., predicting a coordinate location of an embedding in a domain-specific region).

In operation, a domain-specific intermediate representation 304 is passed to the domain-specific coordinate mapper 104 such that the domain-specific coordinate mapper 104 predicts output 510 corresponding to a coordinate location in a domain specific region (e.g., an embedding space). Specifically, the domain-specific coordinate mapper 104 applies the current state of the domain-specific coordinate mapper 104 to the input (e.g., the domain-specific intermediate representation 304). The predicted output 510 determined by the domain-specific coordinate mapper 104 is the predicted domain-specific representation of a next token. For example, $$e_b^1$$

corresponding to a domain-specific intermediate representation 304 of a first token is passed to the domain-specific coordinate mapper 104. The domain-specific coordinate mapper 104 predicts output 510 corresponding to the domain-specific representation of a next token (e.g., $$e_B^2).$$

During a next training iteration, the domain-specific intermediate representation 304 corresponding to a second token (e.g., $$e_b^2)$$

is passed to tie domain-specie coordinate mapper 104. The domain-specific coordinate mapper 104 predicts output 510 corresponding to the domain-specific representation of the next token (e.g., $$e_B^3).$$

The training manager 310 compares the predicted output 510 to the actual output 506 (e.g., the domain-specific representation 306 corresponding to the domain-specific intermediate representation 304) and determines an amount of error or difference. Example loss functions are provided in Equations (3)-(4) below:

$$\min_c \sum_{t=1}^{T-1} \mathcal{L}(e_b(t) + J_{b \to B}(e_b(t))C(e_b(t)), e_B(t)) \quad (3)$$

$$\min_c \sum_{t=1}^{T-1} \mathcal{L}\left(W_E^T e_b(t) + W_E^T J_{b \to B}(e_b(t))C(e_b(t)), x_{t+1}\right) \quad (4)$$

Equation (3) and (4) above are approximately equal, but Equation (3) represents determining the loss at the embedding level and Equation (4) represents determining the loss at the token level. Accordingly, Equation (3) is an example of reconstruction loss such as L2 (e.g., mean square error), whereas Equation (4) is an example of classification loss such as cross entropy loss. In both equations, min represents the optimization of the coordinate model parameters. That is, each iteration c, the parameters of the domain-specific coordinate mapper 104 are optimized with respect to the error between the actual output 506 and the predicted output 510. The predicted output 510 is represented as $e_B(t)$ in Equation (3) and $x_{t+1}$ in Equation (4) respectively.

In some embodiments, the index $t=1, \ldots, T$ corresponds to the sentence index at the token level. For example, as described herein, each word of the sentence is tokenized and encoded with positional information. The combination of $J_{b \to B}$ ($e_b(t)C(e_b(t))$) represents a predicted coordinate of a domain-specific representation 306 in a domain-specific region. In Equation (4), $$W_E^T$$

is an embedding matrix that represents a dictionary of words learned by a pretrained machine learning model (e.g., the domain-specific machine learning model 120). In general, machine learning models predict a candidate next token given an input token by comparing a predicted output embedding (e.g., such as the embedding determined to be predicted output 510) to entries of the embedding matrix $$W_E^T.$$

The error, represented by error signal 512, is used to adjust the weights of the domain-specific coordinate mapper 104 such that the predicted output 510 determined by the domain-specific coordinate mapper 104 converges with the actual output 506 of the training data 302. In some embodiments, the domain-specific coordinate mapper 104 is trained using the backpropagation algorithm. The backpropagation algorithm operates by propagating the error signal 512 through weights of the domain-specific coordinate mapper 104. While supervised learning is described, other training methods can be used to train the domain-specific coordinate mapper 104.

It should be appreciated that the inclusion of the $e_b$ (t) in both Equation (3) and Equation (4) corresponds to the optional residual connection between block 1 202 and block N 208 in FIG. 2. Because such a connection is optional, the inclusion of $e_b$ (t) in both Equation (3) and Equation (4) is similarly optional. Other terms can be included in the loss functions to smooth training convergence and increase stability of the backpropagation algorithm.

Figure 6:
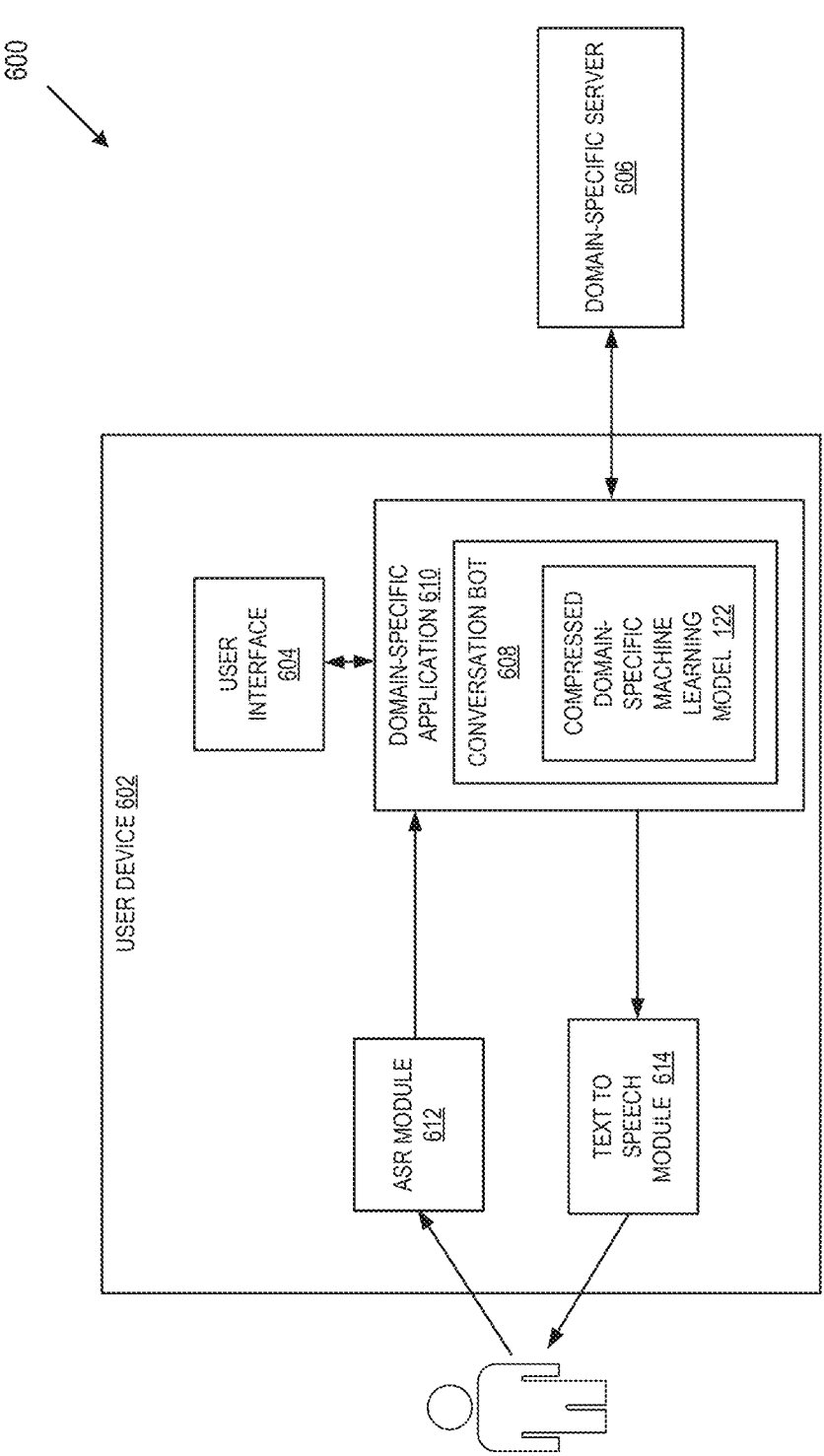
FIG. 6 illustrates an example deployment of a compressed machine learning model, in accordance with one or more embodiments.

FIG. 6 illustrates an example deployment of a compressed machine learning model, in accordance with one or more embodiments. The approximation system 100 compresses the compressed domain-specific machine learning model 122 by virtue of removing any one or more layers of a domain-specific machine learning model (such as domain-specific machine learning model 120 described in FIG. 1). The removed layers are replaced with one or more approximated blocks, where the output of the approximated block corresponds to the output of one or more layers of the domain-specific machine learning model 120.

Example 600 illustrates a user using a user device 602. The user device 602 is a computing device such as a mobile computing device (e.g., a laptop, a mobile phone) with limited computing resources. For example, the computing resources of user device 602 (e.g., power and/or memory) are limited by the size of the user device (e.g., a handheld device) or a battery of the user device, for instance. The user interface 604 is a portion of the user device 602 that presents information to the user such as images, natural language, video, and the like. For example, the user interface 604 can include a graphical display used to provide information to the user. The user interface 604 is also configured to receive information from a user such as natural language, audio, images, and the like.

The user device 602 includes domain-specific application 610, which can be one or more applications accessible by the user device 602. In some embodiments, domain-specific application 610 is downloaded and installed on user device 602. In other embodiments, domain-specific application 610 is accessed by the user device 602 via a web browser, for instance. The domain-specific application 610 can offer the user one or more domain-specific services. Non-limiting examples of domain-specific services can include access to a doctor's office (e., scheduling a doctor's appointment) and access to hospitality services (e.g., reserving a hotel room, making a dinner reservation), for instance. For example, a first domain-specific application enables a user to make a hostel reservation, a second domain-specific application enables a user to schedule a doctor's appointment, and the like.

The server hosting the domain-specific application 610 is the domain-specific server 606. In some embodiments, the domain-specific application 610 communicates with the domain-specific server 606 in furtherance of performance of a service. For example, an Application Programming Interface (API) of the domain-specific application 610 is used to request information from the domain-specific server 606. An API refers to an interface or communication protocol in a predefined format between a client and a server, for instance. In response to receiving an API call, an action is initiated and generally a response is communicated. For example, responsive to receiving a query from the domain-specific application 610, the domain-specific server 606 retrieves information associated with the user and communicates the user information to the domain-specific application 610. For example, the domain-specific server 606 retrieves information related to the user's scheduled doctor's appointment. The retrieved information can be displayed to the user via user interface 604 and/or provided to the compressed domain-specific machine learning model 122.

In some embodiments, a user communicates with the domain-specific server 606 in a conversational format. For example, the user can input natural language text to the user interface 604 (e.g., a request to make a hotel reservation) and receive a natural language response via the user interface 604 (e.g., confirmation of a reserved hotel room). The conversational format of the communication between the user and the domain-specific application 610 and/or domain-specific server 606 is enabled using a conversation bot 608. In some embodiments, the conversation bot 608 is an automated agent of the domain-specific server 606 (e.g., a chat bot such as a large language model) executed on the user device 602. In operation, the conversation bot 608 includes the compressed domain-specific machine leaning model 122. The compressed domain-specific machine learning model 122 is configured to generate responses to user queries (e.g., generate a natural language response to a user input) according to the particular domain. For example, given the above example where the first domain enables a user to make a hotel reservation, the compressed domain-specific machine learning model 122 generates responses to user queries related to hotel booking.

As shown in example 600, the compressed domain-specific machine learning model 122 is executed at the user device 602, which can reduce latency associated with the user receiving a response from the conversation bot 608. The compressed domain-specific machine learning model 122 can be executed at the user device 602 to produce domain-specific responses to user queries because of the one or more approximated blocks of the compressed domain-specific machine learning model, enabling the compressed domain-specific machine learning model to consume fewer resources (e.g., power, bandwidth, memory) than other non-compressed machine learning models, while still generating responses that are in-domain (e.g., related to hotel booking) and relevant given a user query. In other words, the compressed domain-specific machine learning model 122 is capable of being executed on a low-resource device such as user device 602 as a result of the one or more approximated blocks of the compressed domain-specific machine learning model 122. The execution of the compressed domain-specific machine learning model 122 at the user device 602 enables the conversation bot 608 to generate responses to user queries faster than the execution of machine learning models at the user device 602 that may not be compressed. Additionally, the execution of the compressed domain-specific machine learning model 122 generates responses to user queries using fewer computing resources than machine learning models that may not be compressed, by virtue of fewer blocks of a LLM, as described herein. Further, the compressed domain-specific machine learning model 122 can generate responses to user queries that meet or exceed a threshold accuracy. For example, the compressed domain-specific machine learning model 122 can perform natural language understanding tasks at least at the same accuracy as the accuracy of a non-compressed machine leaning model in performing natural language understanding tasks (e.g., generating responses to user queries in a conversational format). Accordingly, the compressed domain-specific machine learning model 122 can have similar throughout to that of non-compressed machine learning models but at a cheaper cost (in terms of power, bandwidth, time, etc.)

In a non-limiting example, a domain-specific query is spoken by a user. For instance, the user can communicate with the conversation bot 608 using audio communication (e.g., a telephone call, a voice over IP call, an intercom, etc.). The audio communication between the user and the conversation bot 608 includes an audio signal. The audio signal carries contextual information such as words spoken by the user to the conversation bot 608. The contextual information of the audio signal (e.g., words) is transformed into text using automatic speech recognition (ASR) module 612. In some embodiments, the domain-specific application 610 hosts the ASR module 612. The ASR module 612 may use any suitable method of text recognition such as any one or more natural language processing algorithms to convert the audio signal from the user into text. In some embodiments, each word spoken by the user is converted to text.

In some embodiments, the ASR module 612 passes each of the words spoken by the user to the conversation bot 608 as natural language tokens. Accordingly, the domain-specific application 610 can receive a tokenized representation of a portion of the conversation (e.g., a log of the words spoken by the user). In some embodiments, the domain-specific application 610 buffers or otherwise stores the text received from the ASR module 612. By storing the text received from the ASR module 612, the domain-specific application 610 can maintain a log of the conversation between the user and the conversation bot 608. In some embodiments, the log of the conversation is passed to the domain-specific server 606 for storage and/or subsequent processing. In some embodiments, the domain-specific application 610 also receives the audio signal of the conversation between the user and the conversation bot 608, including the words spoken by the user and/or one or more extracted audio features.

The conversation bot 608 uses the compressed domain-specific machine learning model 122 to generate a domain-specific response responsive to the domain-specific query. The compressed domain-specific machine learning model 122 iteratively generates tokens of the domain-specific natural language text (e.g., the domain-specific response) by predicting domain-specific next tokens of the domain-specific natural language text.

The text to speech module 614 can convert natural language text into an audio signal using any suitable method. For example, the speech to text module 614 generates a synthetic voice communicating the text determined by the conversation bot 508 to the user. As a result, the user can audibly perceive (e.g., via the synthetic voice) the domain-specific response determined by the conversation bot 608 responsive to the user query.

Figure 7:
FIG. 7 illustrates a flowchart 700 of a series of acts in a method of machine learning model compression, in accordance with one or more embodiments.
Figure 7:
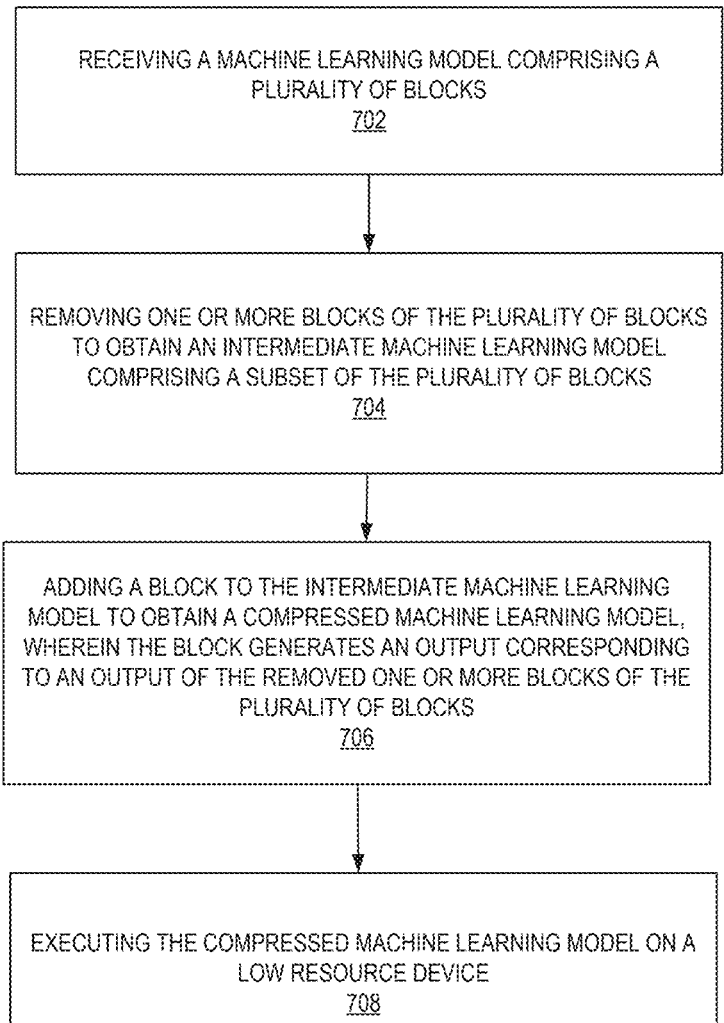

FIGS. 1-6 provide a number of embodiments and components configured to perform such embodiments that allow for compressing a machine learning model. FIG. 7 illustrates a flowchart of an example method of compressing a machine learning model, in accordance with one or more embodiments. It should be appreciated that FIG. 7 may be performed with additional or fewer steps than those indicated in FIG. 7. Moreover, the order of the steps indicated in FIG. 7 may be rearranged without changing the scope of FIG. 7.

FIG. 7 illustrates a flowchart 700 of a series of acts in a method of machine learning model compression, in accordance with one or more embodiments. In one or more embodiments, the flowchart 700 is performed in a digital medium environment that includes the approximation system 100.

As illustrated in FIG. 7, the method 700 includes an act 702 of receiving a machine learning model comprising a plurality of blocks. A block of the machine learning model includes a stack of sequential layers configured to perform a task. For example, a block of a machine learning model can be a stack of layers such as an encoder, a decoder, a transformer, feed forward layers, self-attention layers, cross-attention layers, and the like. The output of each block of the machine learning model is an embedding. An embedding is a latent space representation of an input (e.g., an input token) that encodes the meaning of the input in an embedding space. The machine learning model includes a number of N sequential blocks. Each block of the machine learning model transforms an input into a representation of the input (e.g., a high dimensional representation, a low dimensional representation, an encoded token, extracted features or properties associated with the token, a masked representation of the token, and/or some combination). The machine learning model can generate an output (e.g., a predicted next token) using the sequential processing of representations (e.g., embeddings) determined by each sequential block.

As illustrated in FIG. 7, the method 700 includes an act 704 of removing one or more blocks of the plurality of blocks to obtain an intermediate machine learning model comprising a subset of the plurality of blocks. For example, sequential blocks from the machine learning model are removed. The intermediate machine learning model includes a subset of blocks, where the subset of blocks includes the number of blocks of the machine learning model minus the removed blocks. The first block in the sequence of blocks before the removed blocks is called a first adjacent block, and the first block in the sequence of blocks after the removed block is the second adjacent block.

As illustrated in FIG. 7, the method 700 includes an act 706 of adding a block to the intermediate machine learning model to obtain a compressed machine learning model, wherein the block generates an output corresponding to an output of the removed one or more blocks of the plurality of blocks. For example, a block is added to the intermediate machine learning model between the first and second adjacent blocks such that the added block replaces the removed blocks in the sequence of blocks. The substitution of the one block for the multiple removed blocks reduces the size and complexity of the machine learning model (in terms of the number of layers of the machine learning model, the number of computations associated with performing a task of the machine learning model, and the like). Accordingly, a compressed machine learning model is obtained. The added block of the compressed machine learning model that substitutes the removed blocks of the machine learning model generates an embedding corresponding to an embedding of the machine learning model using a prediction of a downstream embedding space and a prediction of coordinates of the embedding.

As illustrated in FIG. 7, the method 700 includes an act 708 of executing the compressed machine learning model on a low resource device. The low resource device is a computing device such as a mobile computing device (e.g., a laptop, a mobile phone) with limited computing resources. For example, the computing resources of the low resource device (e.g., power and/or memory) are limited by the size of the device (e.g., a handheld device) or a battery of the device, for instance.

Figure 8:
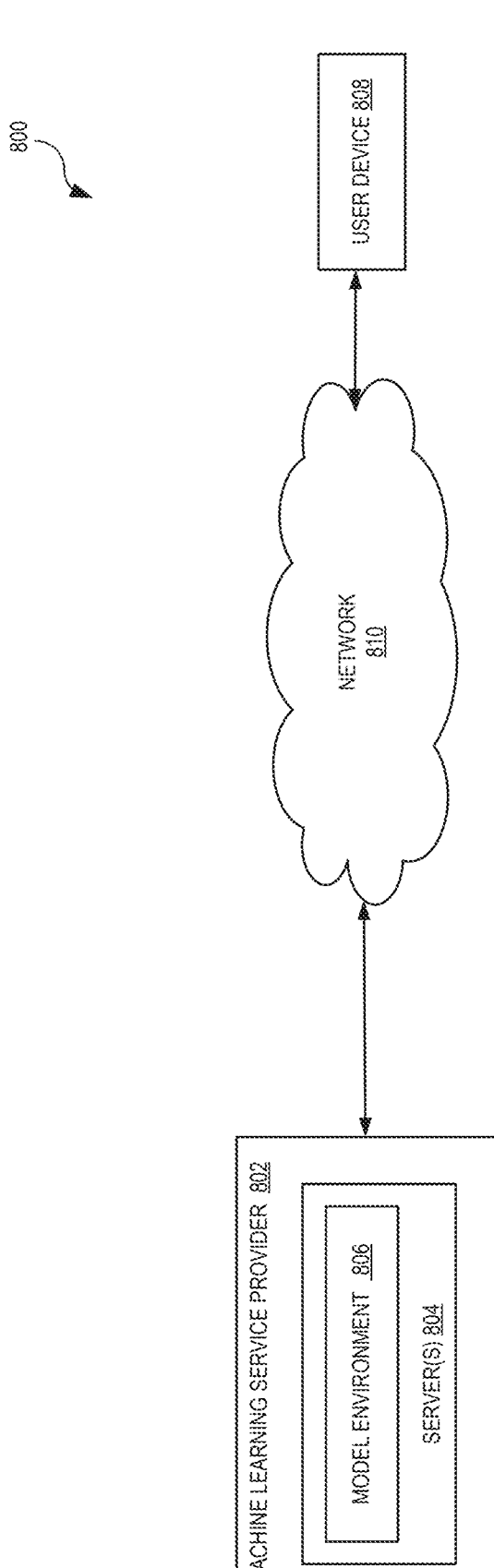
FIG. 8 illustrates a schematic diagram of an environment in which the approximation system can operate in accordance with one or more embodiments.

FIG. 8 illustrates a schematic diagram of an environment in which the approximation system can operate in accordance with one or more embodiments. As shown, the environment 800 includes a machine learning service provider 802 communicating with a user device 808 via a network 810. It should be appreciated that while the user device 808 is shown communicating with the machine learning service provider 802 via network 810, the user device 808 may also communicate directly with the machine learning service provider 802. The communication between the user device 808 and the machine learning service provider 802 via network 810 may be any communication such as wireless communication and/or wired communication. In an example implementation, the machine learning service provider 802 may host the machine learning system on a server 804 using the model environment 806 and receive data from one or more user device(s) 808 via network 810.

The machine learning service provider 802 may be a service provider configured to perform one or more tasks. The machine learning service provider 802 includes one or more server(s) 804 each including a model environment 806. Each of the servers may be specialized to perform a given task of the machine learning service provider 802. Accordingly, each server 804 has a unique model environment 806 that facilitates the operation of the server. The model environment 806 may include any data necessary to perform the operations of the specific server 804 (e.g., trained machine learning models, training data, machine learning libraries, machine learning functions, etc.). In other configurations, a single server may be configured to perform multiple tasks of the machine learning service provider 802. That is, the server 804 may include multiple model environments 806.

The user device 808 may be any computing devices configured to communicate data to the machine learning service provider 802. In some implementations, the user device 808 may capture or otherwise collect such data (e.g., using a camera, a microphone, some combination, or other sensor).

To illustrate, data from one or more user device(s) 808 (e.g., an interaction with an application executing the approximation system 100) may be fed to server 804 via network 810. Upon receiving the data, such as an initiation of a communication (e.g., a telephone call), the server 804 can execute the model environment 806 to execute a compressed machine learning model generated via the approximation system 100. The approximation system 100 performs the methods and processes described herein to compress the machine learning model such that the machine learning model can be implemented in devices such as low-resource devices (e.g., device with limited power, bandwidth, and/or memory as a result of one or more physical attributes such as size of the user device, battery, storage, etc.).

In some embodiments, the data obtained by the server 804 includes a transcript of the communication with the user device 808. In some embodiments, the functions of the machine learning service provider 802 may be implemented via a user device 808. Additionally or alternatively, the functions of the user device 808 may be implemented via the machine learning service provider 802. The functions of the user device 808 and/or machine learning service provider 802 may be implemented in hardware, software, or both. For example, the user device 808 and/or machine learning service provider 802 may include instructions stored on a computer-readable storage medium and executable by processors of the user device 808 and/or machine learning service provider 802. Computer executable instructions may include instructions that cause one or more processors to perform one or more functions. The computer executable instructions may be stored in any computer-readable media accessible by one or more processors of the machine learning service provider 802 and/or the user device 808. In some embodiments, one or more portions of functions of the user device 808 and/or machine learning service provider 802 may be implemented in hardware, software, or both.

While one user device 808 is shown, it should be appreciated that multiple user devices 808 may communicate with the machine learning service provider 802 via network 810. Additionally or alternatively, multiple user devices 808 may communicate with each other (e.g., without communicating with machine learning service provider 802). Moreover, while one machine learning service provider 802 is shown, it should be appreciated that multiple machine learning service providers 802 may communicate with one or more user devices 808. Similarly, multiple machine learning service providers 802 may communicate with each other (e.g., without communicating with the user device 808).

Figure 9:
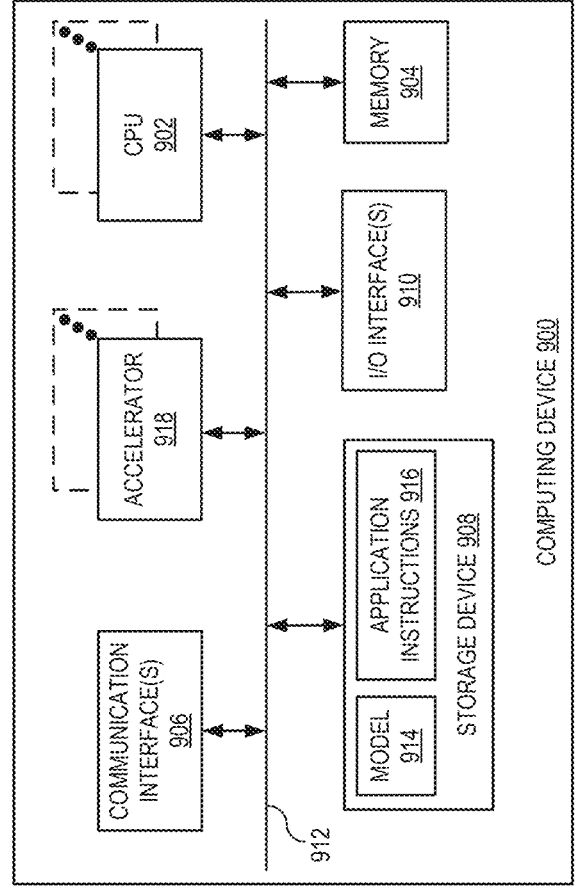
FIG. 9 illustrates a block diagram of an example computing device, in accordance with one or more embodiments.

FIG. 9 illustrates a block diagram of an example computing device, in accordance with one or more embodiments. One or more computing devices such as the computing device 900 may implement one or more portions of the approximation system 100 and/or compressed domain-specific machine learning model 122. As shown in FIG. 9, the computing device can comprise one or more central processing units (CPUs) 902, memory 904, one or more communication interfaces 906, a storage device 908, one or more I/O interfaces 910 and one or more accelerators 918. It should be appreciated that the computing device 900 can include different components than those shown in FIG. 9.

In particular embodiments, CPU(s) 902 include hardware and/or software for executing instructions. Similarly, accelerator(s) 918 include hardware and/or software for executing instructions. In some embodiments, accelerator(s) 918 include one or more graphics processing units (GPUs). In general, the accelerator(s) 918 and CPU(s) 902 fetch data from the storage device 908 and/or memory 904. For example, the accelerator(s) 918 and CPU(s) 902 may fetch instructions from the storage device 908 and/or memory 904 and execute one or more functions identified by the instructions. The CPU(s) 902 and/or accelerator(s) 918 execute the instructions to perform the one or more processes as described herein. For example, CPU 902 may receive instructions from memory 904 (e.g., a non-transitory computer readable medium) and execute those instructions, resulting in one or more processes described herein.

The storage device 908 and/or memory 904 may include non-transitory computer readable memory such as non-volatile and/or non-volatile memory (e.g., RAM, ROM, EEPROM, CD ROM, SSDs, flash memory). The storage device 908 and/or memory 904 may be configured to store different types of data fetched by the CPU 902 and/or accelerator 918. For example, the memory 904 may include instructions directed to the functional operation of the computing device 900. Moreover, the storage device 908 may include application instructions 916 and/or models 914 directed to the use of the approximation system 100 and/or compressed domain-specific machine learning model 122.

For example, the model 914 may include one or more components of the approximation system 100 as described herein. The application instructions 916 may contain instructions necessary to perform the functions of one or more components of the approximation system 100.

The computing device 900 can further include one or more communication interfaces 906. A communication interface 906 can include hardware, software, or both configured to facilitate external communication with one or more external computing devices. The external communication with one or more external computing devices may be wireless communication and/or wired communication. The communication interface 906 may be configured to facilitate such wired/wireless communication.

The bus 912 can facilitate internal communication of the computing device 900 and may comprise hardware, software, or both, coupling components of computing device 900 to each other.

The computing device 900 also includes one or more input or output ("I/O") interfaces 910. The I/O interface 910 is configured to receive inputs/outputs. In an example implementation, the I/O interface 910 may receive user inputs (e.g., audio data, text data, etc.). Additionally or alternatively, the I/O interface 910 may receive sensor inputs (e.g., camera images, video frames, etc.). The I/O interface 910 may be configured to output data (e.g., a response to a user input) to one or more other computing devices.

Various embodiments have been described and illustrated. The descriptions and illustrations herein are not to be construed as limiting. Alternate embodiments may exist without departing from the scope of the embodiments described and illustrated herein.

Disjunctive language such as "at least one of A, B, or C" is not intended to imply that a given embodiment requires at least one of A, at least one of B, or at least one or C. Instead, it is intended to be understood to mean either A, B, or C, or any combination thereof.

What is claimed is:

1. A method comprising:
   receiving a machine learning model comprising a plurality of blocks that each comprise a respective stack of sequential layers configured to perform a task in the machine learning model;
   removing one or more blocks of the plurality of blocks to obtain an intermediate machine learning model comprising a subset of the plurality of blocks;
   adding an approximated block to the intermediate machine learning model to obtain a compressed machine learning model, wherein the approximated block is configured to approximate operation of the removed one or more blocks of the plurality of blocks; and
   executing the compressed machine learning model on a low resource device, wherein the executing comprises:
   predicting, by the approximated block, a domain-specific region.

2. The method of claim 1, wherein the removed one or more blocks are sequential blocks of the plurality of blocks.

3. The method of claim 1, wherein the executing comprises:
   predicting, by the approximated block, a coordinate in an embedding space, wherein the coordinate is based on a sequence of inputs of the machine learning model.

4. The method of claim 1, wherein the executing comprises:
   providing, to the compressed machine learning model, a domain-specific query; and generating, by the compressed machine learning model, domain-specific natural language text responsive to the domain-specific query.

5. The method of claim 1, wherein the executing comprises:

receiving, by the approximated block, an embedding of a token;

generating, by the approximated block, an approximated output that approximates an output that would have been generated by the removed one or more blocks of the plurality of blocks, wherein the approximated output is an embedding of a next token.

6. The method of claim 1, wherein the removed one or more blocks are two or more blocks of the plurality of blocks.

7. A non-transitory computer-readable medium storing executable instructions, which when executed by a computing device, cause the computing device to perform operations comprising:

receiving a machine learning model comprising a plurality of blocks that each comprise a respective stack of sequential layers configured to perform a task in the machine learning model;

removing one or more blocks of the plurality of blocks to obtain an intermediate machine learning model comprising a subset of the plurality of blocks;

adding an approximated block to the intermediate machine learning model to obtain a compressed machine learning model, wherein the approximated block is configured to approximate operation of the removed one or more blocks of the plurality of blocks, and wherein the approximated block is configured to predict a domain-specific region; and providing the compressed machine learning model for execution by a low resource device.

8. The non-transitory computer-readable medium of claim 7, wherein the removed one or more blocks are sequential blocks of the plurality of blocks.

9. The non-transitory computer-readable medium of claim 7, wherein the approximated block is configured to predict a coordinate in an embedding space, wherein the coordinate is based on a sequence of inputs of the machine learning model.

10. The non-transitory computer-readable medium of claim 7, wherein execution of the compressed machine learning model on the low resource device further comprises:

providing, to the compressed machine learning model, a domain-specific query; and generating, by the compressed machine learning model, domain-specific natural language text responsive to the domain-specific query.

11. The non-transitory computer-readable medium of claim 7, the operations further comprising:

receiving, by the approximated block, an embedding of a token;

generating, by the approximated block, and approximated output that approximates an output that would have been generated by the removed one or more blocks of the plurality of blocks, wherein the approximated output is an embedding of a next token.

12. The non-transitory computer-readable medium of claim 7, wherein the removed one or more blocks are two or more blocks of the plurality of blocks.

13. A system comprising:

a computing device configured to perform operations comprising:

receiving a machine learning model comprising a plurality of blocks that each comprise a respective stack of sequential layers configured to perform a task in the machine learning model;

removing one or more blocks of the plurality of blocks to obtain an intermediate machine learning model comprising a subset of the plurality of blocks; and adding an approximated block to the intermediate machine learning model to obtain a compressed machine learning model, wherein the approximated block is configured to approximate operation of the removed one or more blocks of the plurality of blocks, and wherein the approximated block is configured to predict a domain-specific region; and a low resource device configured to receive and execute the compressed machine learning model.

14. The system of claim 13, wherein the removed one or more blocks are sequential blocks of the plurality of blocks.

15. The system of claim 13, wherein the approximated block is configured to predict a coordinate of the output in an embedding space, wherein the coordinate is based on a sequence of inputs of the machine learning model.

16. The system of claim 13, wherein execution of the compressed machine learning model on the low resource device comprises:

providing, to the compressed machine learning model, a domain-specific query; and generating, by the compressed machine learning model, domain-specific natural language text responsive to the domain-specific query.

17. The system of claim 13, wherein execution of the compressed machine learning model on the low resource device comprises:

receiving, by the approximated block, an embedding of a token;

generating, by the approximated block, an approximated output that approximates an output that would have been generated by the removed one or more blocks of the plurality of blocks, wherein the approximated output is an embedding of a next token.

* * * * *